US 012352513B2

(12) United States Patent
Hara et al.

(10) Patent No.: US 12,352,513 B2
(45) Date of Patent: Jul. 8, 2025

(54) HEAT EXCHANGER (71) Applicant: MITSUBISHI HEAVY INDUSTRIES, LTD., Tokyo (JP)

(72) Inventors: Nobuhide Hara, Tokyo (JP); Shimpei Okayasu, Tokyo (JP); Satoshi Hiraoka, Yokohama (JP); Kenji Kirihara, Yokohama (JP); Masahiko Nagai, Yokohama (JP); Kensuke Nishiura, Yokohama (JP); Tatsuo Ishiguro, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 224 days.

(21) Appl. No.: 17/980,157

(22) Filed: Nov. 3, 2022

(65) Prior Publication Data

US 2023/0047365 A1 Feb. 16, 2023

Related U.S. Application Data (63) Continuation of application No. PCT/JP2022/003221, filed on Jan. 28, 2022.

(30) Foreign Application Priority Data

Jan. 29, 2021 (JP) ................................. 2021-013819

(51) Int. Cl.
*F28F 9/22* (2006.01)
*F28D 7/06* (2006.01)
(Continued)

(52) U.S. Cl.
CPC ................. *F28F 9/22* (2013.01); *F28D 7/06* (2013.01); *F28D 7/1607* (2013.01); *F28F 9/013* (2013.01);
(Continued)

(58) Field of Classification Search
CPC .. F28D 7/06; F28D 7/1607; F28D 2021/0026; F28F 9/013; F28F 9/0131;
(Continued)

(56) References Cited

U.S. PATENT DOCUMENTS 2,498,145 A * 2/1950 Tinker ...................... F28F 9/22
165/158
4,553,588 A * 11/1985 Geissler .................. F28F 9/013
165/172

(Continued)

FOREIGN PATENT DOCUMENTS

CN 1370974 9/2002
CN 102735093 10/2012
(Continued)

OTHER PUBLICATIONS

International Search Report issued Mar. 8, 2022 in corresponding International Application No. PCT/JP2022/003221, with English language translation.

(Continued)

*Primary Examiner* — Eric S Ruppert
*Assistant Examiner* — Hans R Weiland
(74) *Attorney, Agent, or Firm* — Wenderoth, Lind & Ponack, L.L.P.

(57) ABSTRACT

A heat exchanger including: a heat exchanger main body forming a flow path through which a fluid circulates; heat transfer tubes arranged side by side so as to extend in an extending direction of the flow path; and a baffle plate group having a plurality of baffle plates provided with gaps therebetween in the extending direction of the flow path while supporting the heat transfer tubes. The baffle plates are provided so as to each occupy only a portion of the flow path cross section when viewed from the extending direction of the flow path, and the baffle plates of the baffle plate group
(Continued)

are provided such that at least a portion of mutually occupied areas do not overlap, and that the entire area of the flow path cross section is occupied by combining the mutually occupied areas, as seen from the extending direction of the flow path.

13 Claims, 5 Drawing Sheets

(51) Int. Cl.
     *F28D 7/16*     (2006.01)
     *F28F 9/013*    (2006.01)
     *F28D 21/00*    (2006.01)
(52) U.S. Cl.
     CPC .................... *F28D 2021/0026* (2013.01); *F28F 2009/226* (2013.01)
(58) Field of Classification Search
     CPC ...... F28F 9/0132; F28F 9/22; F28F 2009/224; F28F 2009/226
     See application file for complete search history.

(56) References Cited

U.S. PATENT DOCUMENTS

| | | | | |
|---|---|---|---|---|
| 6,827,138 | B1* | 12/2004 | Master | F28D 7/1607 165/162 |
| 2005/0161204 | A1* | 7/2005 | Johnston | F28F 9/22 165/162 |
| 2005/0167089 | A1* | 8/2005 | Ozeki | F28D 7/16 165/162 |
| 2006/0231243 | A1* | 10/2006 | Sugihara | F02M 26/32 165/172 |
| 2007/0043238 | A1* | 2/2007 | Yada | C07C 51/252 562/545 |
| 2010/0116477 | A1 | 5/2010 | Mulder | |
| 2012/0018133 | A1* | 1/2012 | Postma | F28D 3/02 165/104.21 |
| 2014/0262171 | A1* | 9/2014 | Ljubicic | B21D 53/06 29/890.03 |
| 2014/0262172 | A1 | 9/2014 | Ljubicic | |
| 2019/0033002 | A1* | 1/2019 | Nakamura | F28F 9/22 |
| 2021/0095928 | A1* | 4/2021 | Krieger | F28F 9/0131 |

FOREIGN PATENT DOCUMENTS

| | | |
|---|---|---|
| CN | 206094996 | 4/2017 |
| CN | 108463682 | 8/2018 |
| CN | 209310560 | 8/2019 |
| CN | 210180231 | 3/2020 |
| JP | 49-67245 | 6/1974 |
| JP | 4-138575 | 12/1992 |
| JP | 6-82191 | 3/1994 |
| JP | 5090464 | 9/2012 |
| JP | 2015-121381 | 7/2015 |
| JP | 2017-141983 | 8/2017 |
| JP | 2019-105418 | 6/2019 |
| KR | 10-2018-0099836 | 9/2018 |

OTHER PUBLICATIONS

Written Opinion of the International Searching Authority issued Mar. 8, 2022 in corresponding International Application No. PCT/JP2022/003221, with English language translation.

* cited by examiner

HEAT EXCHANGER

This application is a continuation application based on a PCT Patent Application No. PCT/JP2022/003221 whose priority is claimed on Japanese Patent Application No. 2021-013819 filed on Jan. 29, 2021. The contents of the PCT Application is incorporated herein by reference.

TECHNICAL FIELD

The present disclosure relates to a heat exchanger.

BACKGROUND ART

For example, in a gas turbine combined cycle (GTCC), a heat exchanger that heats water by exchanging heat between air discharged from a gas turbine and water is used. In the related art, as the heat exchanger, a type called a shell-and-tube type is generally used. In this type of heat exchanger, a plurality of heat transfer tubes through which water flows, a heat exchanger main body that accommodates these heat transfer tubes and that forms a flow path through which air flows, and a plurality of baffle plates arranged at intervals in an extending direction of the flow path are mainly provided. Each baffle plate blocks a part of the flow path. Regions to be blocked are different between baffle plates adjacent to each other. Accordingly, a flow of air flowing through the flow path meanders along the baffle plates, which is said to improve heat exchange efficiency (refer to, for example, PTL 1).

CITATION LIST

Patent Literature (PTL 1) Japanese Unexamined Patent Application Publication No. 2017-141983

SUMMARY OF INVENTION

Technical Problem

However, in the heat exchanger as described above, since the flow suddenly meanders due to the baffle plates, there is a concern that a pressure loss due to the flow of the air may increase. In order to reduce the pressure loss, a method of increasing intervals (pitches) between the heat transfer tubes can be considered. However, in this case, dimensions and size of the entire heat exchanger increase.

The present disclosure has been made to solve the above problems, and an object thereof is to provide a heat exchanger which has a reduced pressure loss and is reduced in size.

Solution to Problem

In order to solve the above problems, a heat exchanger according to the present disclosure includes: a heat exchanger main body that forms a flow path through which a fluid flows; a plurality of heat transfer tubes arranged in the flow path in parallel so as to extend in an extending direction of the flow path; and baffle plate groups each having a plurality of baffle plates provided at intervals in the extending direction of the flow path while supporting the heat transfer tubes in the flow path, in which each of the baffle plates is provided so as to occupy only a part of a flow path cross section when viewed in the extending direction of the flow path, and the plurality of baffle plates of the baffle plate group are provided so that at least parts of occupied regions of the baffle plates do not overlap each other when viewed in the extending direction of the flow path and the occupied regions that are combined occupy an entire region of the flow path cross section.

Another heat exchanger according to the present disclosure includes: a heat exchanger main body that forms a flow path through which a fluid flows; a partition plate that partitions the flow path into an upside region and a downside region; an opening formed in a portion of the partition plate close to an end portion thereof on a downstream side of the upside region and which communicates the upside region with the downside region; a plurality of heat transfer tubes arranged in the flow path in parallel so as to extend in an extending direction of the flow path; and baffle plate groups each having a plurality of baffle plates provided at intervals in the extending direction of the flow path while supporting the heat transfer tubes in the flow path, wherein each of the baffle plates is provided so as to occupy only a part of a flow path cross section when viewed in the extending direction of the flow path, and the plurality of baffle plates of the baffle plate group are provided so that at least parts of occupied regions of the baffle plates do not overlap each other when viewed in the extending direction of the flow path and the occupied regions that are combined occupy an entire region of the flow path cross section, wherein the plurality of baffle plates of the baffle plate group in the upside region are provided so that the occupied regions transition in stages from an outer peripheral side to an inner peripheral side of the heat exchanger main body in a direction from an upstream side to a downstream side in the extending direction of the flow path, and wherein the plurality of baffle plates of the baffle plate group in the downside region are provided so that the occupied regions transition in stages from the inner peripheral side to the outer peripheral side of the heat exchanger main body in the direction from the upstream side to the downstream side in the extending direction of the flow path.

Advantageous Effects of Invention

According to the present disclosure, it is possible to provide a heat exchanger in which a pressure loss is reduced and the size is reduced.

DESCRIPTION OF EMBODIMENTS

First Embodiment (Configuration of Heat Exchanger)

Hereinafter, a heat exchanger 100 according to a first embodiment of the present disclosure will be described with reference to FIGS. 1 and 2. The heat exchanger 100 is provided, for example, in the middle of a gas turbine combined cycle. The heat exchanger 100 is used to exchange heat between bleed air taken from a gas turbine compressor and water so as to heat the water and cool the air.

Figure 1:
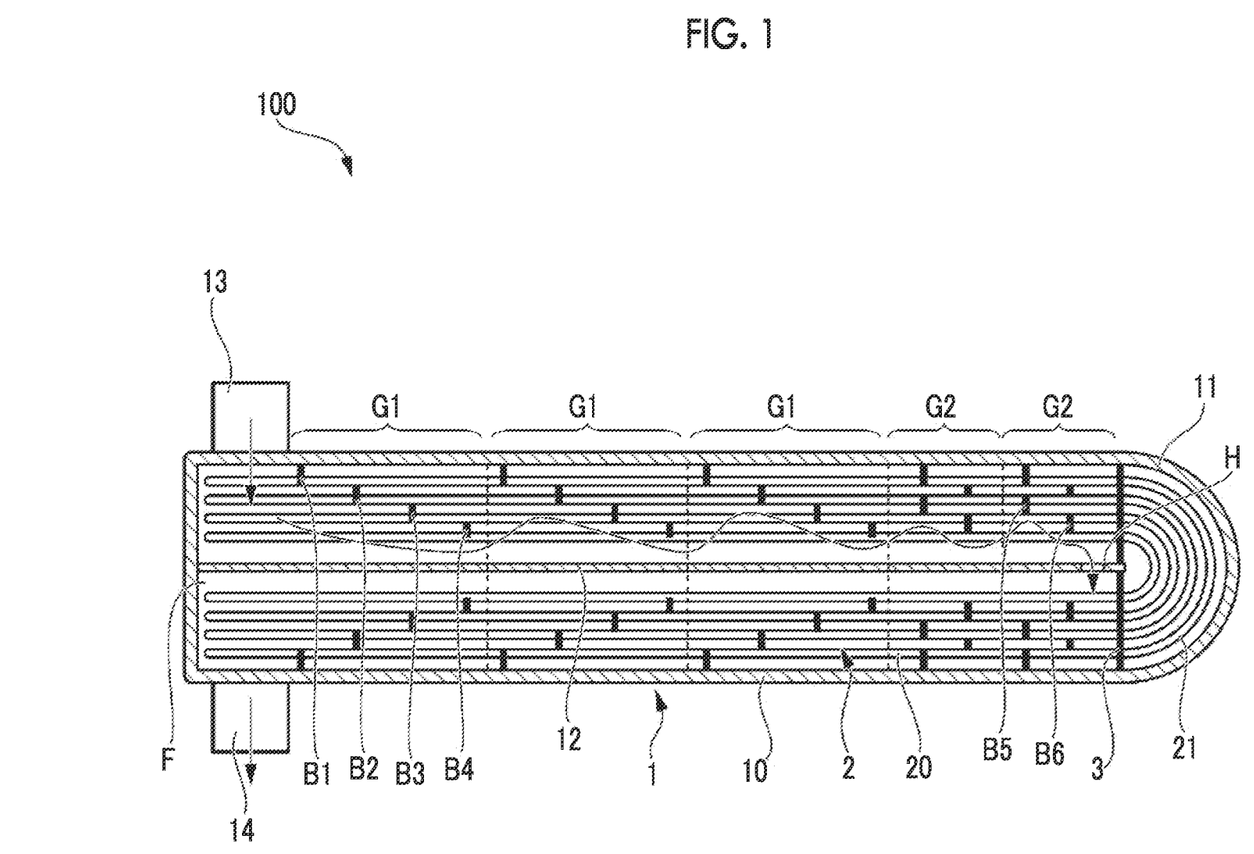
FIG. 1 is a schematic cross-sectional view showing a configuration of a heat exchanger according to a first embodiment of the present disclosure.
Figure 2:
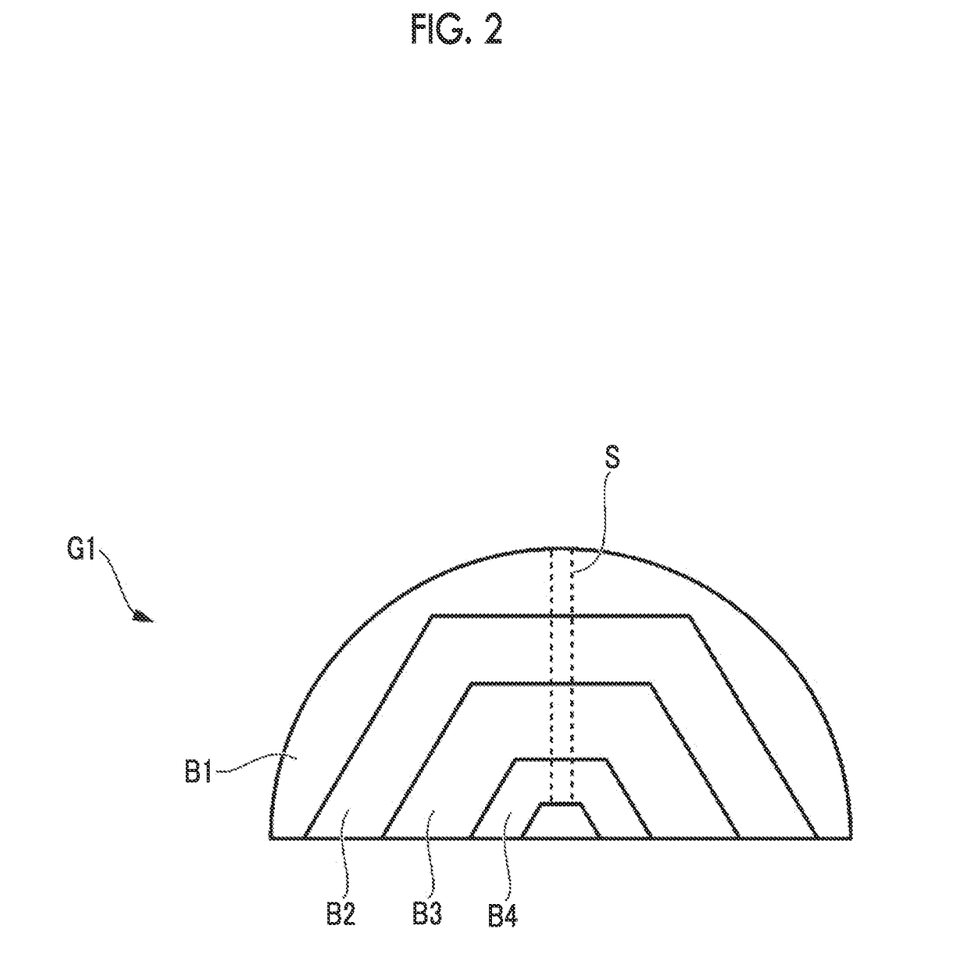
FIG. 2 is a projection view of a baffle plate group according to the first embodiment of the present disclosure as viewed in an extending direction of a flow path.

As shown in FIG. 1, the heat exchanger 100 includes a heat exchanger main body 1, heat transfer tubes 2, and baffle plate groups G1 and G2. The heat exchanger main body 1 forms a flow path F through which a fluid (air) flows. The heat transfer tubes 2 and the baffle plate groups G1 and G2 are accommodated in the flow path F.

(Configuration of Heat Exchanger Main Body)

The heat exchanger main body 1 has a body portion 10, a bottom portion 11, a partition plate 12, a gas inlet 13, a gas outlet 14, and a closing portion 3. The body portion 10 has a cylindrical shape. Hereinafter, a direction in which the flow path F in the body portion 10 extends is simply referred to as an "extending direction". The gas inlet 13 and the gas outlet 14 are provided on one side of the body portion 10 in the extending direction. The gas inlet 13 extends upward from the body portion 10. The gas outlet 14 extends downward from the body portion 10. Air is introduced into the flow path F from the outside through the gas inlet 13. In addition, after flowing through the flow path F, the air is discharged to the outside through the gas outlet 14. In the following description, one side in the extending direction is referred to as an upstream side, and the other side is referred to as a downstream side.

An end portion of the body portion 10 on the downstream side in the extending direction is blocked by the bottom portion 11. The bottom portion 11 has a hemispherical shape, and protrudes in a curved shape from the end portion of the body portion 10 toward the downstream side. Furthermore, the partition plate 12 that partitions the flow path F in an up-down direction is provided inside the body portion 10. An opening H is formed in a portion of the partition plate 12 close to an end portion thereof on the downstream side. That is, an upper region and a lower region of the flow path F communicate with each other via the opening H. The closing portion 3 is a circular plate provided at the end portion of the body portion 10 on the downstream side. The closing portion 3 forms a partition between the body portion 10 and the bottom portion 11. Accordingly, the air flowing through the flow path F does not flow inside of the bottom portion 11.

(Configuration of Heat Transfer Tube)

A plurality of the heat transfer tubes 2 are disposed in the flow path F at intervals from each other. Each heat transfer tube 2 has a straight portion 20 extending in the extending direction and a bend portion 21 connecting end portions of the straight portion 20 on the downstream side to each other. Specifically, the straight portion 20 of the heat transfer tube 2 located above the partition plate 12 and the straight portion 20 of the heat transfer tube 2 located below the partition plate 12 are connected by the bend portion 21. That is, the bend portion 21 is curved from an upper side to a lower side toward the downstream side. In the flow path F, a plurality of such heat transfer tubes 2 are three-dimensionally arranged at intervals. Water introduced from the outside flows inside the heat transfer tube 2. It is desirable that the heat transfer tube 2 is formed of a metallic material such as a copper alloy having good thermal conductivity.

(Composition of Baffle Plate Group)

The above-described heat transfer tubes 2 are supported and fixed to the heat exchanger main body 1 by the baffle plate groups G1 and G2. A plurality of (three as an example) baffle plate groups G1 are arranged in the extending direction from the upstream side of the flow path F. Two baffle plate groups G2 are arranged adjacent to the most downstream side baffle plate group G1 toward the downstream side.

The baffle plate group G1 has four baffle plates B1, B2, B3, and B4. The baffle plates B1, B2, B3, and B4 are arranged at intervals in the extending direction. As shown in FIG. 2, areas of the respective baffle plates B1, B2, B3, and B4 are set so as to occupy only parts of a flow path cross section of the flow path F when viewed in the extending direction. Furthermore, the areas and shapes of the baffle plates B1, B2, B3, and B4 belonging to the same baffle plate group G1 are set so that at least parts of occupied regions of the baffle plates B1, B2, B3, and B4 do not overlap each other when viewed in the extending direction. In addition, the areas of the baffle plates B1, B2, B3, and B4 are set so as to occupy an entire region of the flow path cross section of the flow path F when the occupied regions of the baffle plates B1, B2, E3, and B4 are combined.

Specifically, the baffle plate 31 is located on an outermost peripheral side of the flow path F. An end edge of the baffle plate 31 on an outer peripheral side is fixed to an inner surface of the body portion 10. The end edge of the baffle plate B1 on the outer peripheral side has an arc shape. An end edge of the baffle plate B1 on an inner peripheral side is formed by three straight lines having the same length. An angle formed by the straight lines adjacent to each other is 120°.

The baffle plate B2 is located on the inner peripheral side of the baffle plate B1. When viewed in the extending direction, the end edge of the baffle plate B1 on the inner peripheral side and an end edge of the baffle plate B2 on the outer peripheral side are in contact with each other. That is, the end edge of the baffle plate B2 on the outer peripheral side is formed by the above-described three straight lines. An end edge of the baffle plate B2 on the inner peripheral side is also formed by such three straight lines. In addition, the baffle plate B2 is fixed to the heat exchanger main body 1 by a fixing portion S protruding upward.

The baffle plates B3 and B4 have the same configuration as the baffle plates B1 and B2 except that areas and dimensions are different. That is, the baffle plate B3 is smaller than the baffle plate B2, and the baffle plate B4 is smaller than the baffle plate B3. As described above, in the baffle plate group G1, the occupied regions transition in stages from the outer peripheral side to the inner peripheral side in a direction from the upstream side to the downstream side in the extending direction.

Alternatively, in the baffle plate group G1, the occupied regions may transition in stages from the inner peripheral side to the outer peripheral side in a direction from the upstream side to the downstream side in the extending direction.

The baffle plate group G2 has two baffle plates B5 and B6. The baffle plates B5 and E6 are arranged at intervals in the extending direction. Similarly to the above-described baffle plate group G1, areas of the respective baffle plates B5 and B6 are set so as to occupy only parts of the flow path cross section of the flow path F when viewed in the extending direction. Furthermore, the areas and shapes of the baffle plates B5 and B6 belonging to the same baffle plate group G2 are set so that at least parts of occupied regions of the baffle plates B5 and B6 do not overlap each other when viewed in the extending direction. In addition, the areas of the baffle plates B5 and B6 are set so as to occupy the entire region of the flow path cross section of the flow path F when the occupied regions of the baffle plates B5 and B6 are combined. As described above, in the baffle plate group G1 occupying a portion close to the gas inlet 13 and the gas outlet 14, and a portion excluding the bend portion 21, the number of baffle plates B1 to B4 is four or more. In addition, it is desirable that the interval between the baffle plates B1 and B4 is 50% or more of an inner diameter of the body portion 10. More desirably, the interval between the baffle plates B1 to B4 is made to be twice or more a width of the baffle plates B1 to B4.

(Operational Effects)

Next, an operation of the heat exchanger 100 will be described. In operating the heat exchanger 100, first, high-temperature air is introduced into the flow path F through the gas inlet 13. At the same time, water is caused to flow through the heat transfer tubes 2. As indicated by an arrow in FIG. 1, the air flows while gently meandering in an upper side of the flow path F while being guided by a plurality of the baffle plate groups G1 and G2. Thereafter, the air flows into a lower side of the flow path F through the opening H formed in the partition plate 12. Similarly, in the lower side of the flow path F, the air flows while meandering toward the gas outlet 14 while being guided by the baffle plate groups G1 and G2.

While the air flows in the flow path F in this way, the air exchanges heat with the water flowing in the heat transfer tube 2. Accordingly, the water is heated by the heat of the air and is raised in temperature. On the other hand, the air that loses heat is cooled to a low temperature. Thereafter, the water is taken out and used for various applications. The air is discharged to the outside.

Here, in recent years, there has been a strong demand for a reduction in a pressure loss of air in a heat exchanger. For such a demand, for example, increasing the interval (pitch) between the heat transfer tubes 2 can be considered as an example. However, in this case, the dimensions and size of the entire apparatus increase, which may hinder installation and transportation. Therefore, the heat exchanger 100 according to the present embodiment adopts the above-described configuration.

According to the above configuration, the baffle plate group G1 having the four baffle plates B1, B2, B3, and B4 and the baffle plate group G2 having the two baffle plates B5 and B6 are provided in the flow path F. Accordingly, while the flow of the air passes through the plurality of baffle plate groups G1 and G2, the flow meanders so as to avoid each of the baffle plate groups G1 and G2. Since a plurality of the baffle plates B1, B2, B3, and B4 or the baffle plates B5 and B6 are configured so that their occupied regions do not overlap each other, the amount of deflection of the flow of the air generated when the flow collides with the baffle plates is relatively small. That is, the baffle plate groups G1 and G2 do not significantly obstruct the flow of the air. Therefore, a pressure loss of the flow due to the baffle plate groups G1 and G2 can be minimized. As a result, performance (processing amount) of the heat exchanger 100 can be further improved. In addition, since the pitch between the heat transfer tubes 2 can be maintained at the same level as in the related art, it is possible to avoid an increase in size of the heat exchanger 100.

Furthermore, according to the above configuration, since the occupied regions of the plurality of the baffle plates B1, B2, B3, and B4 or the baffle plates B5 and B6 transition in stages from the outer peripheral side to the inner peripheral side, the amount of deflection of the flow between the baffle plates adjacent to each other becomes small. Accordingly, the fluid can flow more smoothly from the upstream side to the downstream side. As a result, the pressure loss due to the baffle plates can be further minimized.

Here, since a direction of the flow of the air changes through the opening B in the vicinity of the bend portion 21 of the heat transfer tube 2, it is desirable to reduce a flow velocity of the fluid. According to the above configuration, the number of baffle plates B5 and B6 in the baffle plate group G2 adjacent to the bend portion 21 is smaller than that in the baffle plate group G1 on the upstream side. That is, in the baffle plate group G2, a ratio of each of the baffle plates B5 and B6 to the flow path cross section is large. In the baffle plate group G2, in order to stably support a heat transfer tube group as a measure against vibration, the ratio of each of the baffle plates B5 and B6 to a vibration flow path cross section is increased.

Hereinabove, the first embodiment of the present disclosure has been described. In addition, various changes and modifications of the above-described configuration can be made without departing from the gist of the present disclosure. For example, the number of the above-described battle plate groups G1 and G2 is an example, and can be appropriately changed according to design and specifications. The same applies to the number of baffle plates belonging to the baffle plate groups G1 and G2.

In addition, a horizontal installation of the heat exchanger main body 1 in which the extending direction of the flow path F described above intersects the up-down direction is an example. The heat exchanger main body 1 can be vertically installed such that the flow path F extends in the up-down direction. When the heat exchanger main body 1 is vertically installed, an installation area of the heat exchanger 100 can be reduced.

Modification Example of First Embodiment

Hereinafter, a modification example of the first embodiment will be described with reference to FIG. 3.

Figure 3:
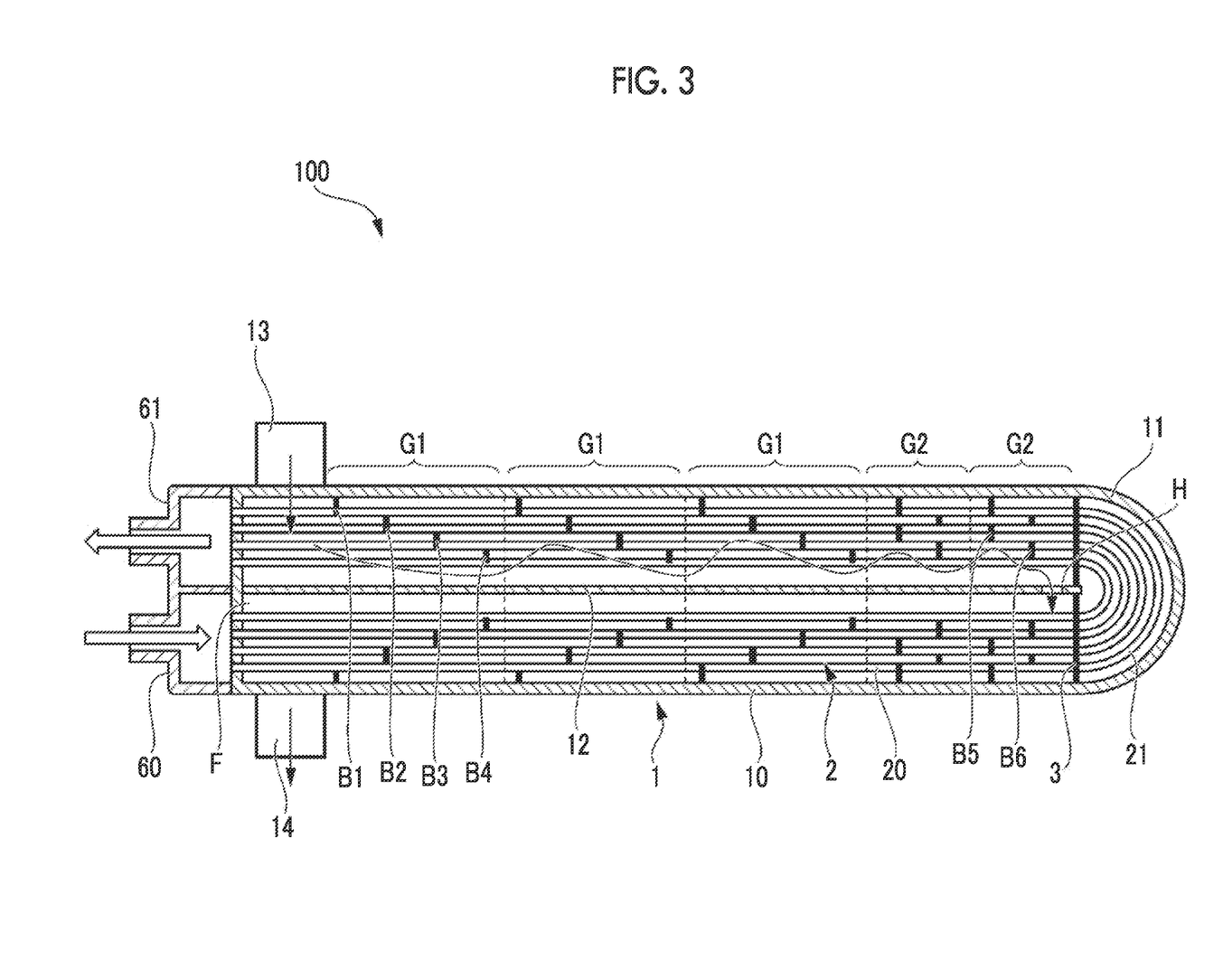
FIG. 3 is a schematic cross-sectional view showing a configuration of a heat exchanger according to a first modification example of the first embodiment of the present disclosure.

As shown in FIG. 3, the heat exchanger 100 may include a supply portion 60 that supplies water to the heat transfer tube 2 from the outside, and a discharge portion 61 that discharges the water from the heat transfer tube 2 to the outside. The supply portion 60 and the discharge portion 61 are provided at an end portion of the body portion 10 opposite to the bottom portion 11 in the extending direction.

The supply portion 60 is provided on a gas outlet 14 side (a lower half of the body portion 10) of the body portion 10 with respect to the partition plate 12. The straight portion 20 of the heat transfer tube 2 located above the partition plate 12 penetrates the body portion 10 and communicates with the supply portion 60.

The discharge portion 61 is provided on a gas inlet 13 side (an upper half of the body portion 10) of the body portion 10 with respect to the partition plate 12. The straight portion 20 of the heat transfer tube 2 located below the partition plate 12 penetrates the body portion 10 and communicates with the discharge portion 61.

In the present modification example, water is introduced from the outside into the heat transfer tube 2 through the supply portion 60 as indicated by a thick arrow in FIG. 3. Subsequently, the water flows inside the heat transfer tubes 2 and exchanges heat with the air inside the flow path F. Thereafter, the water flows out from the inside of the heat transfer tubes 2 to the outside through the discharge portion 61.

Second Embodiment

Figure 4:
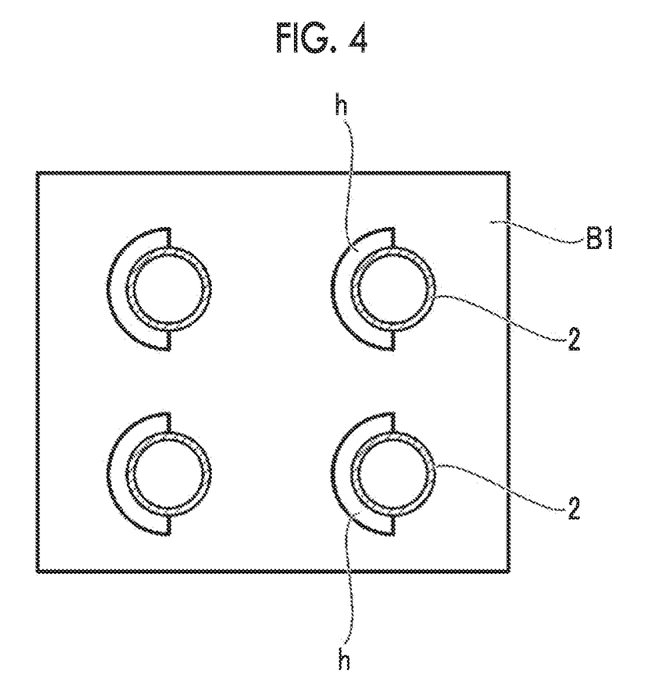
FIG. 4 is an enlarged view of a main part of a baffle plate according to a second embodiment of the present disclosure.

Next, a second embodiment of the present disclosure will be described with reference to FIG. 4. Configurations similar to those in the first embodiment are assigned the same reference numerals, and detailed description thereof will be omitted. In addition, in FIG. 4, only one baffle plate B1 is shown as a representative out of the baffle plates B1, B2, B3, B4, B5, and B6. As shown in the figure, in the present embodiment, through-holes h are formed in portions of the baffle plate B1 through which the heat transfer tubes 2 are inserted. The through-hole h is formed so as to surround at least a part of a periphery of the heat transfer tube 2 from the outer peripheral side. In the example of FIG. 4, the through-hole h has a semicircular shape. That is, the through-hole h is formed in a region of 180° of the periphery of the heat transfer tube 2.

According to the above configuration, since the fluid (air) flows to the downstream side through the through-hole h, the increase in the pressure loss due to the provision of the baffle plate B1 can be further minimized. As a result, the performance (processing amount) of the heat exchanger 100 can be further improved.

Hereinabove, the second embodiment of the present disclosure has been described. In addition, various changes and modifications of the above-described configuration can be made without departing from the gist of the present disclosure.

Third Embodiment

Figure 5:
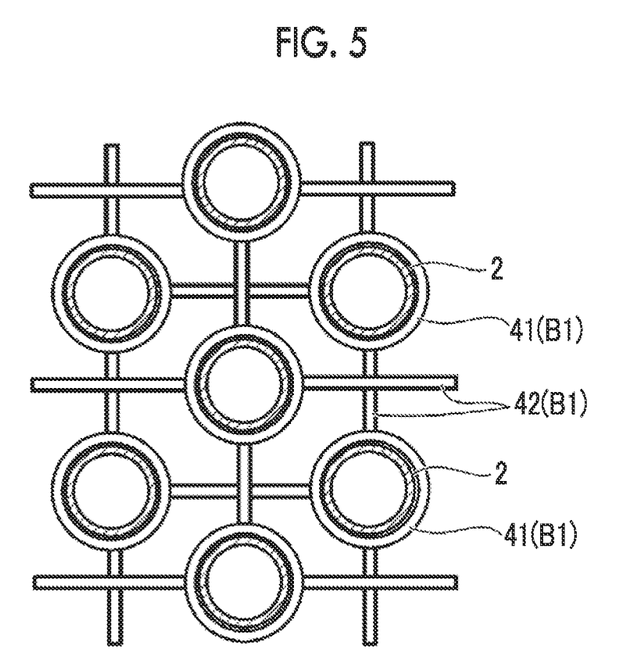
FIG. 5 is an enlarged view of a main part of a baffle plate according to a third embodiment of the present disclosure.

Subsequently, a third embodiment of the present disclosure will be described with reference to FIG. 5. Configurations similar to those in each of the above-described embodiments are assigned the same reference numerals, and detailed description thereof will be omitted. In addition, similarly to the second embodiment, only the baffle plate B1 will be shown and described as a representative. As shown in FIG. 5, the baffle plate B1 has peripheral edge portions 41 and support portions 42. The peripheral edge portion 41 has an annular shape surrounding the periphery of the heat transfer tube 2. The support portion 42 has a rod shape that connects the peripheral edge portions 41 adjacent to each other. In addition, the support portions 42 that intersect each other overlap each other. Accordingly, a mesh-like gap is formed between the support portions 42.

According to the above configuration, since the air flows through the gap formed between the support portions 42, the increase in the pressure loss due to the provision of the baffle plate B1 can be further minimized.

Figure 6:
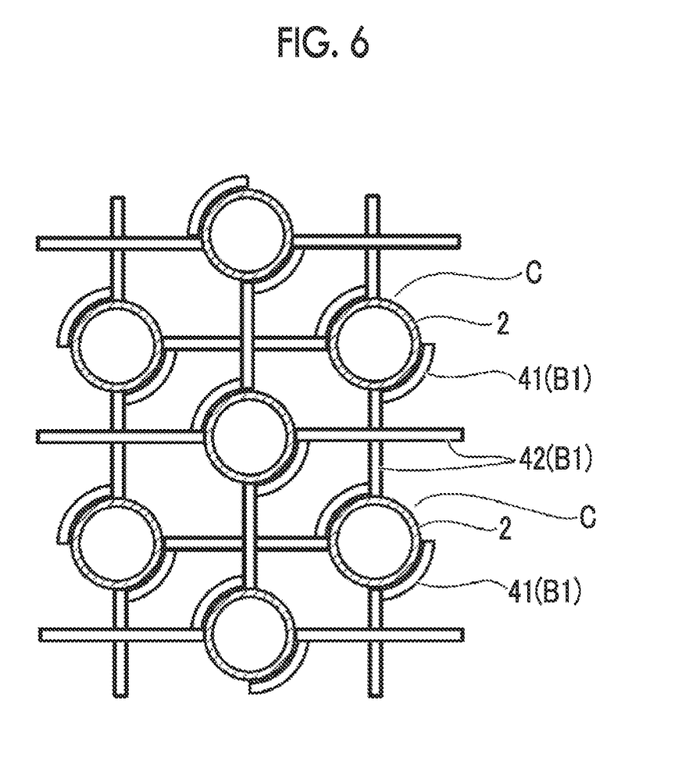
FIG. 6 is an enlarged view of a main part showing a modification example of the baffle plate according to the third embodiment of the present disclosure.

Hereinabove, the third embodiment of the present disclosure has been described. In addition, various changes and modifications of the above-described configuration can be made without departing from the gist of the present disclosure. For example, as a modification example, as shown in FIG. 6, it is also possible to form a cutout C in a part of the peripheral edge portion 41. Two cutouts C are formed in the peripheral edge portion 41 in angle ranges of 90° opposite each other. According to this configuration, the fluid flows through the cutouts C of the peripheral edge portion 41 in addition to through the gap between the support portions 42. Therefore, the pressure loss due to the provision of the baffle plate B1 can be further minimized.

Fourth Embodiment

Figure 7:
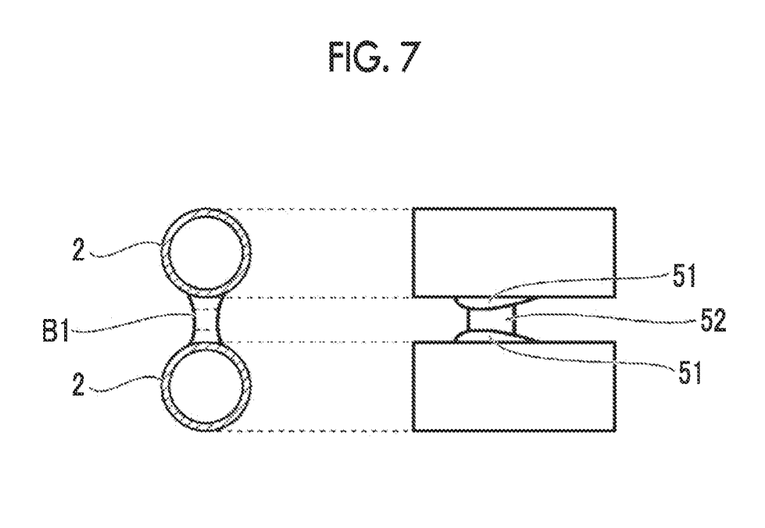
FIG. 7 is a two-sided view showing a configuration of a baffle plate according to a fourth embodiment of the present disclosure.

Subsequently, a fourth embodiment of the present disclosure will be described with reference to FIG. 7. Configurations similar to those in each of the above-described embodiments are assigned the same reference numerals, and detailed description thereof will be omitted. In addition, similarly to the second embodiment, only the baffle plate B1 will be shown and described as a representative. As shown in FIG. 7, the baffle plate B1 according to the present embodiment has a connecting portion 52 that connects the heat transfer tubes 2 to each other, and base end portions 51 that are respectively provided at both end portions of the connecting portion 52. The base end portion 51 protrudes from the heat transfer tube 2 toward the outer peripheral side and has a streamlined cross-sectional shape from the upstream side to the downstream side in the extending direction. In addition, when viewed in the extending direction, the base end portions 51 and the connecting portion 52 have a shape in which a central portion thereof is constricted.

According to this configuration, since the base end portion 51 has a streamlined cross-sectional shape, resistance of the air flowing around a periphery of the base end portion 51 is reduced. Accordingly, the increase in the pressure loss due to the provision of the baffle plate B1 can be further minimized. As a result, performance (processing amount) of the heat exchanger 100 can be further improved.

Hereinabove, the fourth embodiment of the present disclosure has been described. In addition, various changes and modifications of the above-described configuration can be made without departing from the gist of the present disclosure.

<Additional Notes>

The heat exchanger 100 described in each of the embodiments is identified, for example, as follows.

(1) The heat exchanger 100 according to a first aspect includes: the heat exchanger main body 1 that forms the flow path F through which the fluid flows; the plurality of heat transfer tubes 2 arranged in the flow path F in parallel so as to extend in the extending direction of the flow path F; and the baffle plate groups G1 and G2 each having the plurality of baffle plates provided at intervals in the extending direction of the flow path F while supporting the heat transfer tubes 2 in the flow path F, in which each of the baffle plates is provided so as to occupy only a part of a flow path cross section when viewed in the extending direction of the flow path F, and the plurality of baffle plates of the baffle plate groups G1 and G2 are provided so that the occupied regions of the baffle plates do not overlap each other when viewed in the extending direction of the flow path F and the occupied regions that are combined occupy the entire region of the flow path cross section.

According to the above configuration, while the flow of the fluid passes through the plurality of baffle plate groups G1 and G2, the flow meanders so as to avoid each of the baffle plates. Since the plurality of baffle plates are configured so that the occupied regions thereof do not overlap each other, the flow is not significantly obstructed. Therefore, the pressure loss of the flow due to the baffle plates can be minimized.

(2) In the heat exchanger 100 according to a second aspect, in the plurality of baffle plates of the baffle plate groups G1 and G2, the occupied regions may transition either: in stages from the outer peripheral side to the inner peripheral side of the heat exchanger main body 1 in the direction from the upstream side to the downstream side in the extending direction of the flow path F; or in stages from the inner peripheral side to the outer peripheral side of the heat exchanger main body 1 in the direction from the upstream side to the downstream side in the extending direction of the flow path F.

According to the above configuration, since the occupied regions of the plurality of baffle plates transition either: in stages from the outer peripheral side to the inner peripheral side of the heat exchanger main body; or in stages from the inner peripheral side to the outer peripheral side, the fluid can flow more smoothly from the upstream side to the downstream side. Accordingly, the pressure loss due to the baffle plates can be further minimized.

(3) The heat exchanger 100 according to a third aspect includes: the heat exchanger main body 1 that forms the flow path F through which the fluid flows; the partition plate 12 that partitions the flow path F into the upside region and the downside region; the opening H formed in the portion of the partition plate 12 close to the end portion thereof on the downstream side of the upside region and which communicates the upside region with the downside region; the plurality of heat transfer tubes 2 arranged in the flow path F in parallel so as to extend in the extending direction of the flow path F; and the baffle plate groups G1 and G2 each having the plurality of baffle plates B1, B2, B3, B4, B5 and B6 provided at intervals in the extending direction of the flow path F while supporting the heat transfer tubes 2 in the flow path F, wherein each of the baffle plates is provided so as to occupy only the part of the flow path cross section when viewed in the extending direction of the flow path F, and the plurality of baffle plates of the baffle plate group are provided so that at least parts of occupied regions of the baffle plates do not overlap each other when viewed in the extending direction of the flow path F and the occupied regions that are combined occupy the entire region of the flow path cross section, wherein the plurality of baffle plates B1, B2, B3 and B4 of the baffle plate group G1 in the upside region are provided so that the occupied regions transition in stages from the outer peripheral side to the inner peripheral side of the heat exchanger main body 1 in the direction from the upstream side to the downstream side in the extending direction of the flow path F, and wherein the plurality of baffle plates B5 and B5 of the baffle plate group G2 in the downside region are provided so that the occupied regions transition in stages from the inner peripheral side to the outer peripheral side of the heat exchanger main body 1 in the direction from the upstream side to the downstream side in the extending direction of the flow path F.

According to the above configuration, since the occupied regions of the plurality of baffle plates in the upside region transition in stages from the outer peripheral side to the inner peripheral side of the exchanger main body and the occupied regions of the plurality of baffle plates in the downside region transition in stages from the inner peripheral side to the outer peripheral side, the fluid can flow more smoothly from the upstream side to the downstream side. Accordingly, the pressure loss due to the baffle plates can be further minimized.

(4) In the heat exchanger 100 according to a fourth aspect, the heat transfer tube 2 may have the straight portions 20 extending in the extending direction, and the bend portion 21 connecting the end portions of the straight portions 20 on the downstream side, and in the baffle plate group G2 on the most downstream side adjacent to the bend portion 21, the number of baffle plates may be smaller than that of the other baffle plate group G1 located on the upstream side.

Here, since the direction of the flow changes in the vicinity of the bend portion 21, it is desirable to reduce the flow velocity of the fluid. According to the above configuration, the number of baffle plates in the baffle plate group G2 adjacent to the bend portion 21 is smaller than that in the baffle plate group G1 on the upstream side. That is, in the baffle plate group G2, the ratio of each of the baffle plates to the flow path cross section is large. Therefore, the direction of the flow changes more rapidly, and the velocity of the fluid can be reduced. As a result, heat exchange between the heat transfer tube 2 and the fluid can be performed more efficiently.

(5) In the heat exchanger 100 according to a fifth aspect, the through-hole h that penetrates the baffle plate in the extending direction may be formed in at least a part of the periphery of the heat transfer tube 2 in the baffle plate.

According to the above configuration, since the fluid flows through the through-hole h, the increase in the pressure loss due to the baffle plate can be further minimized.

(6) In the heat exchanger 100 according to a sixth aspect, the baffle plate may have a peripheral edge portion 41 that surrounds a periphery of the heat transfer tube 2, and support portions 42 that connect a plurality of the peripheral edge portions 41 to each other and that form a gap between the support portions 42.

According to the above configuration, since the fluid flows through the gap formed between the support portions 42, the increase in the pressure loss due to the baffle plate can be minimized.

(7) In the heat exchanger 100 according to a seventh aspect, the cutout C may be formed in at least a part of the peripheral edge portion 41.

According to the above configuration, since the fluid flows through the cutout C of the peripheral edge portion 41 in addition to through the gap between the support portions 42, the pressure loss due to the baffle plate can be further minimized.

(8) In the heat exchanger 100 according to an eighth aspect, the baffle plate may have the base end portion 51 that protrudes from the heat transfer tube 2 and that has a streamlined cross-sectional shape from the upstream side to the downstream side in the extending direction, and the connecting portion 52 that connects the base end portions 51 adjacent to each other.

According to the above configuration, since the base end portion 51 has a streamlined cross-sectional shape, the resistance of the air flowing around the periphery of the base end portion 51 is reduced. Accordingly, the increase in the pressure loss due to the provision of the baffle plate B1 can be further minimized.

INDUSTRIAL APPLICABILITY

According to the present disclosure, it is possible to provide a heat exchanger in which a pressure loss is reduced and the size is reduced.

REFERENCE SIGNS LIST

100 Heat exchanger
1 Heat exchanger main body
2 Heat transfer tube

3 Closing portion
10 Body portion
11 Bottom portion
12 Partition plate
13 Gas inlet
14 Gas outlet
20 Straight portion
21 Bend portion
41 Peripheral edge portion
42 Support portion
51 Base end portion
52 Connecting portion
60 Supply portion
61 Discharge portion
B1, B2, B3, B4, B5, B6 Baffle plate
C Cutout
F Flow path
G1, G2 Baffle plate group
H Opening
h Through-hole
S Fixing portion

The invention claimed is:

1. A heat exchanger comprising:
a heat exchanger main body that forms a flow path through which a fluid flows;
a plurality of heat transfer tubes arranged in the flow path in parallel so as to extend in an extending direction of the flow path; and
baffle plate groups provided at intervals in the extending direction of the flow path while supporting the heat transfer tubes in the flow path, wherein
each of the baffle plate groups has a plurality of baffle plates provided at intervals in the extending direction of the flow path,
each of the baffle plates is provided so as to occupy only a part of a flow path cross section when viewed in the extending direction of the flow path,
an end edge of a baffle plate on an outer peripheral side located on an outermost peripheral side of the flow path among the plurality of baffle plates is in contact with an inner wall surface of the flow path, and
the plurality of baffle plates belonging to the same baffle plate groups are arranged so as to not overlap each other when viewed in the extending direction of the flow path.

2. The heat exchanger according to claim 1, wherein, in the plurality of baffle plates of the baffle plate groups, occupied regions transition either: in stages from an outer peripheral side to an inner peripheral side of the heat exchanger main body in a direction from an upstream side to a downstream side in the extending direction of the flow path; or in stages from the inner peripheral side to the outer peripheral side of the heat exchanger main body in the direction from the upstream side to the downstream side in the extending direction of the flow path.

3. A heat exchanger comprising:
a heat exchanger main body that forms a flow path through which a fluid flows;
a partition plate that partitions the flow path into an upside region and a downside region;
an opening formed in a portion of the partition plate close to an end portion thereof on a downstream side of the upside region and which communicates the upside region with the downside region;
a plurality of heat transfer tubes arranged in the flow path in parallel so as to extend in an extending direction of the flow path; and
baffle plate groups provided at intervals in the extending direction of the flow path while supporting the heat transfer tubes in the flow path, wherein
each of the baffle plate groups has a plurality of baffle plates provided at intervals in the extending direction of the flow path,
each of the baffle plates is provided so as to occupy only a part of a flow path cross section when viewed in the extending direction of the flow path,
an end edge of a baffle plate on an outer peripheral side located on an outermost peripheral side of the flow path among the plurality of baffle plates is in contact with an inner wall surface of the flow path,
the plurality of baffle plates belonging to the same baffle plate group are arranged so as to not overlap each other when viewed in the extending direction of the flow path,
the plurality of baffle plates of the baffle plate groups in the upside region are provided so that occupied regions transition in stages from an outer peripheral side to an inner peripheral side of the heat exchanger main body in a direction from an upstream side to a downstream side in the extending direction of the flow path, and
the plurality of baffle plates of the baffle plate groups in the downside region are provided so that the occupied regions transition in stages from the inner peripheral side to the outer peripheral side of the heat exchanger main body in the direction from the upstream side to the downstream side in the extending direction of the flow path.

4. The heat exchanger according to claim 1,
wherein the heat transfer tube has
straight portions extending in the extending direction, and
a bend portion connecting end portions of the straight portions on a downstream side, and
in the baffle plate groups on a most downstream side adjacent to the bend portion, the number of baffle plates is smaller than that of the other baffle plate groups located on an upstream side.

5. The heat exchanger according to claim 1,
wherein a through-hole that penetrates the baffle plate in the extending direction is formed in at least a part of a periphery of the heat transfer tube in the baffle plate.

6. The heat exchanger according to claim 1,
wherein the baffle plate has
a peripheral edge portion that surrounds a periphery of the heat transfer tube, and
support portions that connect a plurality of the peripheral edge portions to each other and that form a gap between the support portions.

7. The heat exchanger according to claim 6,
wherein a cutout is formed in at least a part of the peripheral edge portion.

8. The heat exchanger according to claim 1,
wherein the baffle plate has
a base end portion that protrudes from the heat transfer tube and that has a streamlined cross-sectional shape from an upstream side to a downstream side in the extending direction, and
a connecting portion that connects the base end portions adjacent to each other.

9. The heat exchanger according to claim 3,
wherein the heat transfer tube has
- straight portions extending in the extending direction, and
- a bend portion connecting end portions of the straight portions on a downstream side, and in the baffle plate groups on a most downstream side adjacent to the bend portion, the number of baffle plates is smaller than that of the other baffle plate groups located on an upstream side.

10. The heat exchanger according to claim 3,
wherein a through-hole that penetrates the baffle plate in the extending direction is formed in at least a part of a periphery of the heat transfer tube in the baffle plate.

11. The heat exchanger according to claim 3,
wherein the baffle plate has
- a peripheral edge portion that surrounds a periphery of the heat transfer tube, and
- support portions that connect a plurality of the peripheral edge portions to each other and that form a gap between the support portions.

12. The heat exchanger according to claim 11,
wherein a cutout is formed in at least a part of the peripheral edge portion.

13. The heat exchanger according to claim 3,
wherein the baffle plate has
- a base end portion that protrudes from the heat transfer tube and that has a streamlined cross-sectional shape from an upstream side to a downstream side in the extending direction, and
- a connecting portion that connects the base end portions adjacent to each other.

* * * * *